US 7,286,998 B2

(12) United States Patent
Sauser et al.

(10) Patent No.: US 7,286,998 B2
(45) Date of Patent: Oct. 23, 2007

(54) SYSTEM AND METHOD FOR TRAVEL CARRIER CONTRACT MANAGEMENT AND OPTIMIZATION USING SPEND ANALYSIS

(75) Inventors: Olivier Sauser, Jouars Ponchartrain (FR); Dionino Florio, London (GB)

(73) Assignee: American Express Travel Related Services Company, Inc., New York, NY (US)

( * ) Notice: Subject to any disclaimer, the term of this patent is extended or adjusted under 35 U.S.C. 154(b) by 1045 days.

(21) Appl. No.: 10/127,483

(22) Filed: Apr. 22, 2002

(65) Prior Publication Data

US 2002/0194038 A1    Dec. 19, 2002

Related U.S. Application Data

(60) Provisional application No. 60/285,529, filed on Apr. 20, 2001.

(51) Int. Cl.
G06F 9/44 (2006.01)
(52) U.S. Cl. ......................................................... 705/7
(58) Field of Classification Search ...................... 705/7
See application file for complete search history.

(56) References Cited

U.S. PATENT DOCUMENTS

| | | | |
|---|---|---|---|
| 4,845,625 A | 7/1989 | Stannard | |
| 4,862,357 A | 8/1989 | Ahlstrom et al. | |
| 4,922,439 A | 5/1990 | Greenblatt | |
| 4,965,763 A | 10/1990 | Zamora | |
| 5,021,953 A | 6/1991 | Webber et al. | |
| 5,056,019 A | 10/1991 | Schultz et al. | |
| 5,155,678 A | 10/1992 | Fukumoto et al. | |
| 5,191,523 A * | 3/1993 | Whitesage ...................... 705/6 | |
| 5,237,499 A | 8/1993 | Garback | |
| 5,241,671 A | 8/1993 | Reed et al. | |
| 5,253,165 A | 10/1993 | Leiseca et al. | |
| 5,253,166 A | 10/1993 | Dettelbach et al. | |
| 5,255,184 A | 10/1993 | Hornick et al. | |
| 5,270,921 A | 12/1993 | Hornick | |
| 5,287,278 A | 2/1994 | Rau | |
| 5,289,371 A | 2/1994 | Abel et al. | |
| 5,331,546 A * | 7/1994 | Webber et al. .................. 705/6 | |

(Continued)

FOREIGN PATENT DOCUMENTS

EP    0762306 A2 *  12/1997

(Continued)

OTHER PUBLICATIONS

"American Express unveils 'American Express @ Work', New Desktop portal for corporate travel & Purchasing" by PR Newswire, Jul. 19, 1999.*

(Continued)

*Primary Examiner*—Tariq R. Hafiz
*Assistant Examiner*—Scott L. Jarrett
(74) *Attorney, Agent, or Firm*—Snell & Wilmer L.L.P.

(57) ABSTRACT

A method and system for air carrier contract management and optimization is disclosed. In particular, the present invention receives and tracks client travel data and air carrier contract data, analyzes this data and configures the data structure to be used in a goal programming algorithm to determine an optimum travel carrier solution.

18 Claims, 11 Drawing Sheets

U.S. PATENT DOCUMENTS

| | | | |
|---|---|---|---|
| 5,459,306 A | 10/1995 | Stein et al. | |
| 5,483,444 A | 1/1996 | Heintzeman et al. | |
| 5,526,443 A | 6/1996 | Nakayama | |
| 5,570,283 A | 10/1996 | Shoolery et al. | |
| 5,581,461 A | 12/1996 | Coll et al. | |
| 5,598,557 A | 1/1997 | Doner et al. | |
| 5,644,721 A * | 7/1997 | Chung et al. | 705/6 |
| 5,648,900 A | 7/1997 | Bowen et al. | |
| 5,652,842 A | 7/1997 | Siegrist, Jr. et al. | |
| 5,687,322 A | 11/1997 | Deaton et al. | |
| 5,761,442 A | 6/1998 | Barr et al. | |
| 5,764,981 A | 6/1998 | Brice et al. | |
| 5,781,892 A | 7/1998 | Hunt et al. | |
| 5,809,478 A | 9/1998 | Grefco et al. | |
| 5,812,134 A | 9/1998 | Pooser et al. | |
| 5,832,451 A | 11/1998 | Flake et al. | |
| 5,832,453 A * | 11/1998 | O'Brien | 705/6 |
| 5,832,454 A | 11/1998 | Jafri et al. | |
| 5,839,114 A | 11/1998 | Lynch et al. | |
| 5,842,176 A | 11/1998 | Hunt et al. | |
| 5,857,175 A | 1/1999 | Day et al. | |
| 5,894,311 A | 4/1999 | Jackson | |
| 5,894,475 A | 4/1999 | Bruno et al. | |
| 5,897,620 A | 4/1999 | Walker et al. | |
| 5,909,510 A | 6/1999 | Nakayama | |
| 5,918,022 A | 6/1999 | Batz et al. | |
| 5,926,798 A | 7/1999 | Carter | |
| 5,940,803 A | 8/1999 | Kanemitsu | |
| 5,948,040 A | 9/1999 | DeLorme et al. | |
| 5,953,706 A | 9/1999 | Patel | |
| 5,960,383 A | 9/1999 | Fleischer | |
| 5,968,125 A | 10/1999 | Garrick et al. | |
| 5,974,396 A | 10/1999 | Anderson et al. | |
| 5,983,246 A | 11/1999 | Takano | |
| 5,999,728 A | 12/1999 | Cable | |
| 6,009,403 A | 12/1999 | Sato | |
| 6,009,408 A | 12/1999 | Buchanan | |
| 6,012,069 A | 1/2000 | Shibazaki | |
| 6,018,715 A * | 1/2000 | Lynch et al. | 705/5 |
| 6,018,718 A | 1/2000 | Walker et al. | |
| 6,023,679 A | 2/2000 | Acebo et al. | |
| 6,024,288 A | 2/2000 | Gottlich et al. | |
| 6,028,601 A | 2/2000 | Machiraju et al. | |
| 6,029,144 A | 2/2000 | Barrett et al. | |
| 6,067,532 A | 5/2000 | Gebb | |
| 6,070,147 A | 5/2000 | Harms et al. | |
| 6,085,164 A | 7/2000 | Smith et al. | |
| 6,085,169 A | 7/2000 | Walker et al. | |
| 6,085,976 A | 7/2000 | Sehr | |
| 6,101,477 A | 8/2000 | Hohle et al. | |
| 6,112,185 A | 8/2000 | Walker et al. | |
| 6,118,989 A | 9/2000 | Abe et al. | |
| 6,119,094 A * | 9/2000 | Lynch et al. | 705/5 |
| 6,119,095 A | 9/2000 | Morita | |
| 6,119,096 A | 9/2000 | Mann et al. | |
| 6,119,229 A | 9/2000 | Martinez et al. | |
| 6,121,969 A | 9/2000 | Jain et al. | |
| 6,122,642 A | 9/2000 | Mehovic | |
| 6,134,534 A | 10/2000 | Walker et al. | |
| 6,148,290 A | 11/2000 | Dan et al. | |
| 6,151,582 A | 11/2000 | Huang et al. | |
| 6,157,915 A | 12/2000 | Bhaskaran et al. | |
| 6,157,918 A | 12/2000 | Shepherd | |
| 6,163,771 A | 12/2000 | Walker et al. | |
| 6,167,368 A | 12/2000 | Wacholder | |
| 6,185,524 B1 | 2/2001 | Carus et al. | |
| 6,185,558 B1 | 2/2001 | Bowman et al. | |
| 6,185,592 B1 | 2/2001 | Boguraev et al. | |
| 6,188,989 B1 | 2/2001 | Kennedy | |
| 6,195,644 B1 | 2/2001 | Bowie | |
| 6,223,163 B1 | 4/2001 | Van Luchene | |
| 6,263,315 B1 | 7/2001 | Talluri | |
| 6,304,850 B1 * | 10/2001 | Keller et al. | 705/5 |
| 6,324,517 B1 * | 11/2001 | Bingham et al. | 705/8 |
| 6,336,097 B1 * | 1/2002 | Scipioni | 705/6 |
| 6,442,526 B1 * | 8/2002 | Vance et al. | 705/5 |
| 6,477,520 B1 * | 11/2002 | Malaviya et al. | 706/47 |
| 6,754,634 B1 * | 6/2004 | Ho | 705/6 |
| 6,804,658 B2 * | 10/2004 | Lim et al. | 705/10 |
| 6,839,679 B1 * | 1/2005 | Lynch et al. | 705/5 |
| 6,944,133 B2 | 9/2005 | Wisner et al. | |
| 6,963,854 B1 * | 11/2005 | Boyd et al. | 705/37 |
| 7,016,859 B2 * | 3/2006 | Whitesage | 705/8 |
| 7,050,986 B1 * | 5/2006 | Vance et al. | 705/5 |
| 7,165,036 B2 * | 1/2007 | Kruk et al. | 705/1 |
| 2001/0005831 A1 | 6/2001 | Lewin et al. | |
| 2001/0034626 A1 * | 10/2001 | Gillespie | 705/6 |
| 2001/0051885 A1 | 12/2001 | Nardulli et al. | |
| 2002/0010604 A1 | 1/2002 | Block | |
| 2002/0013774 A1 | 1/2002 | Morimoto | |
| 2002/0077871 A1 * | 6/2002 | Udelhoven et al. | 705/5 |
| 2002/0143587 A1 * | 10/2002 | Champernowne | 705/5 |
| 2002/0152101 A1 | 10/2002 | Lawson et al. | |
| 2002/0178034 A1 | 11/2002 | Garner et al. | |
| 2003/0115159 A1 * | 6/2003 | Gillespie | 705/400 |
| 2006/0111956 A1 | 5/2006 | Whitesage | |
| 2006/0146806 A1 | 7/2006 | Khuc et al. | |

FOREIGN PATENT DOCUMENTS

| | | | |
|---|---|---|---|
| FR | 2586316 | | 2/1987 |
| JP | 2002-32682 A | | 1/2002 |
| WO | WO 95/26007 | * | 9/1995 |
| WO | WO 97/17680 A1 | | 5/1997 |
| WO | WO 01/04823 A2 | | 1/2001 |
| WO | WO 01/61607 A1 | * | 8/2001 |

OTHER PUBLICATIONS

"Online Corporate Traveler" by Kate Gerwig, InternetWeek, Sep. 14, 1998.*

"American Express launches B2B travel booking technology for mid-sized companies", Canada Newswire, May 29, 2000.*

"American Express launches online business travel fulfillment services", PR Newswire, Oct. 16, 2000.*

"An adaptive interactive agent for route advice" by Rogers et al, ACM, 1999.*

"Bias in computer systems" by Friedman et al, ACM, 1996.*

"Interactive assessment of user preference models: The automated travel assistant" by Linden et al, white paper by the Department of Computer Science and Engineering, University of Washington, 1996.*

"The Nature of Competition in Electronic Markets: An Empirical investigation of the electronic travel agent market" by Clemons et al, WISE, 1997.*

"The Nature of Competition in Electronic Markets: An Empirical investigation of the electronic travel agent offerings" by Clemons et al, white paper by the Department of Operations and Information Management, The Wharton School, Jun. 1999.*

"Data collection and analysis in the air travel planning domain" by Kowtko et al, DARPA Speech and Natural Language Workshop, 1989.*

"Deals on Wheels" by Gill Upton, Supply Management, Jan. 15, 1998.*

"BookIt! Is the internet booking engine of choice for online travel reservations" PR Newswire, Feb. 17, 1999.*

"British Airways: Fifty pluses take flight online", M2 Presswire, Feb. 26, 2001.*

"Thrifty fliers find network of routes to fare deals" by James Yenckel, Chicago Sun Times, Feb. 17, 1991.*

Clemons, Eric K. et al., Ahead of the Pack Through Vision and Hustle: A Case Study of Information Technology at Rosenbluth Travel, Proceedings of the Twenty-Fourth Annual Hawaii International Conference on System Sciences, vol. 4, Jan. 1991 pp. 287-296.*

Greenberg, Ilan, TravelNet to help corporations stem travel expense tide InfoWorld, vol. 17, No. 29, Jul. 17, 1995, p. 25.*

Rosenbluth International and AT&T To Provide Business New Travel Solution PR Newswire, Jul. 19, 1995.*

Clemons, Eric K. et al., Rosenbluth International: Strategic Transformation of a Successful Enterprise Proceedings of the Thirty Second Hawaii International Conference on System Sciences, 1999.*

Di Florio, Dionino et al., Air Deal Manager: American Express Provides an End to End Purchasing Management Solution SAS Conferences XVII SEUGI, Jun. 1999.*

Rosenbluth International Files Suit Against Travel Analytics for Violation of Patent Infringement Laws PR News Wire, Mar. 17, 2000.*

Jones, David, Modeling Tools Mature Business Travel News, vol. 18, Jan. 15, 2001.*

Navigant International Launches Unique Internet-Accessible, Intuitive Reporting Platform PR Newswire, Jan. 18, 2001.*

Di Florio, Diono et al., Air Deal Manager: Corporate Travel Expense Optimisation with the SAS System SAS Conference XIX SEUGI, May-Jun. 2001.*

Campbell, Jay, Dacoda opens for biz: Rosenbluth launches contract optimization service for non-clients Business Travel News, vol. 18, No. 24, Nov. 12, 2001.*

Simbologica Web Pages Simbologica, http://www.simbologica.it, Oct. 2006.*

Shepherd, David, SLAM Model of Domestic Airline Passenger Fairs and The Contract Air Service Program Air Force Institute of Technology, Sep. 1986.*

Travel Manager's Workstation Travel Systems Institute, 1993, pp. 9-35.*

ITT, *Business Travel News*, Jul. 15, 1996, New York, p. 36.

Web Ventures Announces Version 4 of "BookIt Pro—Gives Full Travel Agent Access to Airline Computer Reservations Systems Over the Internet", Oct. 1998; PR Newswire; dialog copy, 2 pgs.

"An Evaluation of Statistical Approaches to Text Categorization", Yiming Yang, Apr. 10, 1997, CMU-CS-97-127.

Maritz Deal, www.findarticles.com, Feb. 14, 2000.

"The Table Lens: Merging Graphical and Symbolic Representations in an Interactive Focus + Context Visualization for Tabular Information", by R. Rao and S. Card, Human Factors in Computing Systems, CHI, '94, "Celebrating Independence", pp. 318-322, 481-482.

thefreedictionary.com website; Dec. 12, 2005; 1 page.

Orbitz website; Sep. 30, 2001, Wayback Machine web archive site, 1 page.

Travelocity website; Nov. 21, 2001, Wayback Machine web archive site, 2 pages.

Ficter and Cervone; Documents, Data Information Retrieval & XML: document retrieval: difficulties of retrieving information from document repositories Online Nov. 1, 2000, 9 pgs.

Chapter 3—Memory Management, linuxhq.com/guides/TLK/mm/memory.html; copyright 1996-1999.

"Memory Offset Annotation", tacc.utexas.edu/services/userguides/intel/ref/ann-mem.htm.

"American Express unveils 'American Express@Work', New Desktop portal for corporate travel & Purchasing" by PR Newswire, Jul. 19, 1999.

"British Airways: Fifty pluses take flight online", M2 Presswire, Feb. 26, 2001.

* cited by examiner

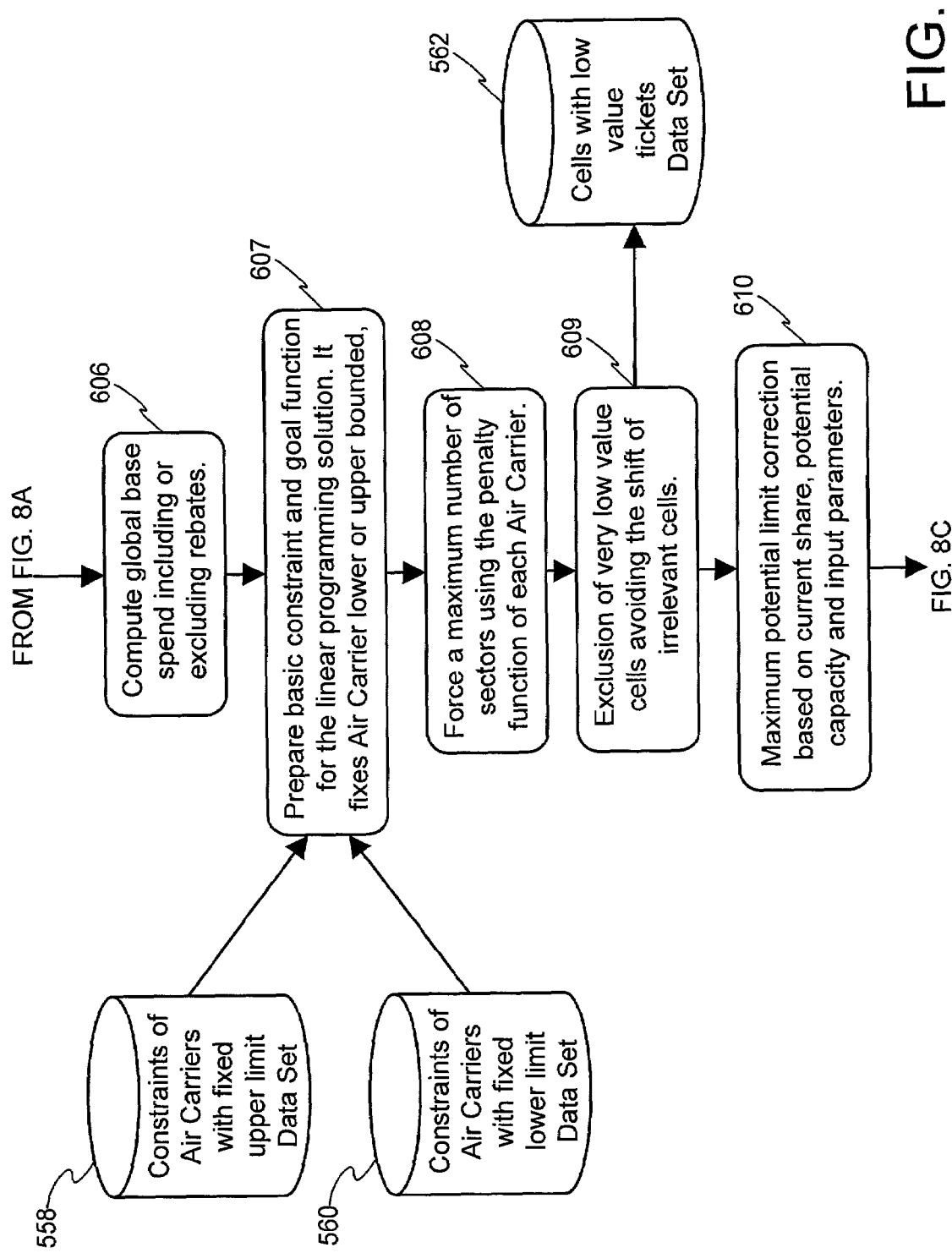

SYSTEM AND METHOD FOR TRAVEL CARRIER CONTRACT MANAGEMENT AND OPTIMIZATION USING SPEND ANALYSIS

RELATED APPLICATIONS

The present application claims the benefit of, and priority to, U.S. Provisional Application No. 60/285,529 filed Apr. 20, 2001; the entire contents of which are hereby incorporated by reference.

FIELD OF INVENTION

The present invention relates, generally, to a system and method for contract management and optimization. More specifically, the invention involves systems for tracking and analyzing travel carrier contract and client data; simulating scenarios based, in part, on this contract data; and engaging in goal programming optimization to determine the optimum variables that will achieve the greatest cost savings to clients.

BACKGROUND OF THE INVENTION

Large companies and organizations typically purchase a significant amount of travel services from a number of different airlines (or travel carriers). A large company (e.g., IBM), with offices and employees located throughout the world, has a significant need for travel services. On any given day, a large company may have hundreds or even thousands of employees traveling from one location to another. Although employees may travel throughout the world, significant travel also takes place between office locations such as the headquarters, manufacturing plants, distribution centers, and the like.

Because of the high volume and frequency of travel, large companies are often able to negotiate special rates and discounts with the travel carriers. Indeed, it is common for any one large company to enter into travel contracts with several travel carriers. These contracts, however, unless properly negotiated and drafted, may not always save the company money. Although a particular contract with a particular carrier may provide a negotiated savings for travel between certain times, to certain locations, and between certain airport hubs, the inconvenience and contractual obligations may result in a net loss in the long run because of, for example, employees missing flights with the negotiated carrier and purchasing last minute flights on non-contract airlines.

Several factors help to determine the net cost savings to the company. Traditionally, companies have attempted to take into account a variety of conditions to optimize their travel needs to negotiate better cost savings. Examples of some of these devices and methods include (1) U.S. Pat. No. 5,832,453 ("Computer System and Method For Determining A Travel Scheme Minimizing Travel Costs for An Organization") issued on Nov. 3, 1998 and assigned to Rosenbluth, Inc.' and (2) U.S. Patent Application Publication No. US 2001/0034526A1 ("Tool for Analyzing Corporate Airline Bids") published on Oct. 25, 2001; the contents of both are incorporated herein by reference. The '453 Patent, in particular, describes a system and process that attempts to determine a travel scheme to minimize travel costs for an organization. The '453 patent relates to a linear programming model that takes into account various conditions and constraints in an effort to determine the minimum travel costs for any particular company during any particular period of time. The system and method described in the '453 patent is limited, however, in that the programming algorithm uses a simplified linear programming model (e.g., objective function analyzing sets of travel information constraints) and only a few available input parameters. Although this model solves some of the traditional problems in the industry, this over-simplified model does not accurately reflect the complex and real life variables which are common-place in today's travel carrier industry.

SUMMARY OF THE INVENTION

The present invention is directed to a system and method for tracking and analyzing travel carrier contract data and client data, performing simulations on this data, and employing a suitable optimization algorithm to analyze multiple variables in order to minimize travel costs for an organization. An exemplary system of the present invention utilizes a data structure comprising client data, contract data, intermediate data based on preceding data set calculations, and an aggregate data set that is appropriately grouped to support multidimensional analysis.

An exemplary method is facilitated by the exchange of information among clients (companies), travel agents, a financial institution and one or more airlines. An exemplary method comprises the steps of importing client data; importing the client exchange rate; importing/exporting contract conditions (e.g., volume, segments, volume share, segment index, volume index, etc.), which take into account, inter alia, various rebates on contracts; configuring goal groups, which are, for example, composite indices of the above contract rebate conditions; and analyzing this data by employing an optimization algorithm.

BRIEF DESCRIPTION OF THE DRAWINGS

The above and other features and advantages of the present invention are hereinafter described in the following detailed description of illustrative embodiments to be read in conjunction with the accompanying drawings and figures, wherein like reference numerals are used to identify the same or similar system parts and/or method steps in the similar views, and:

FIGS. 8A-D is a flow diagram of a more detailed exemplary process flow in accordance with the present invention.

Figure 1:
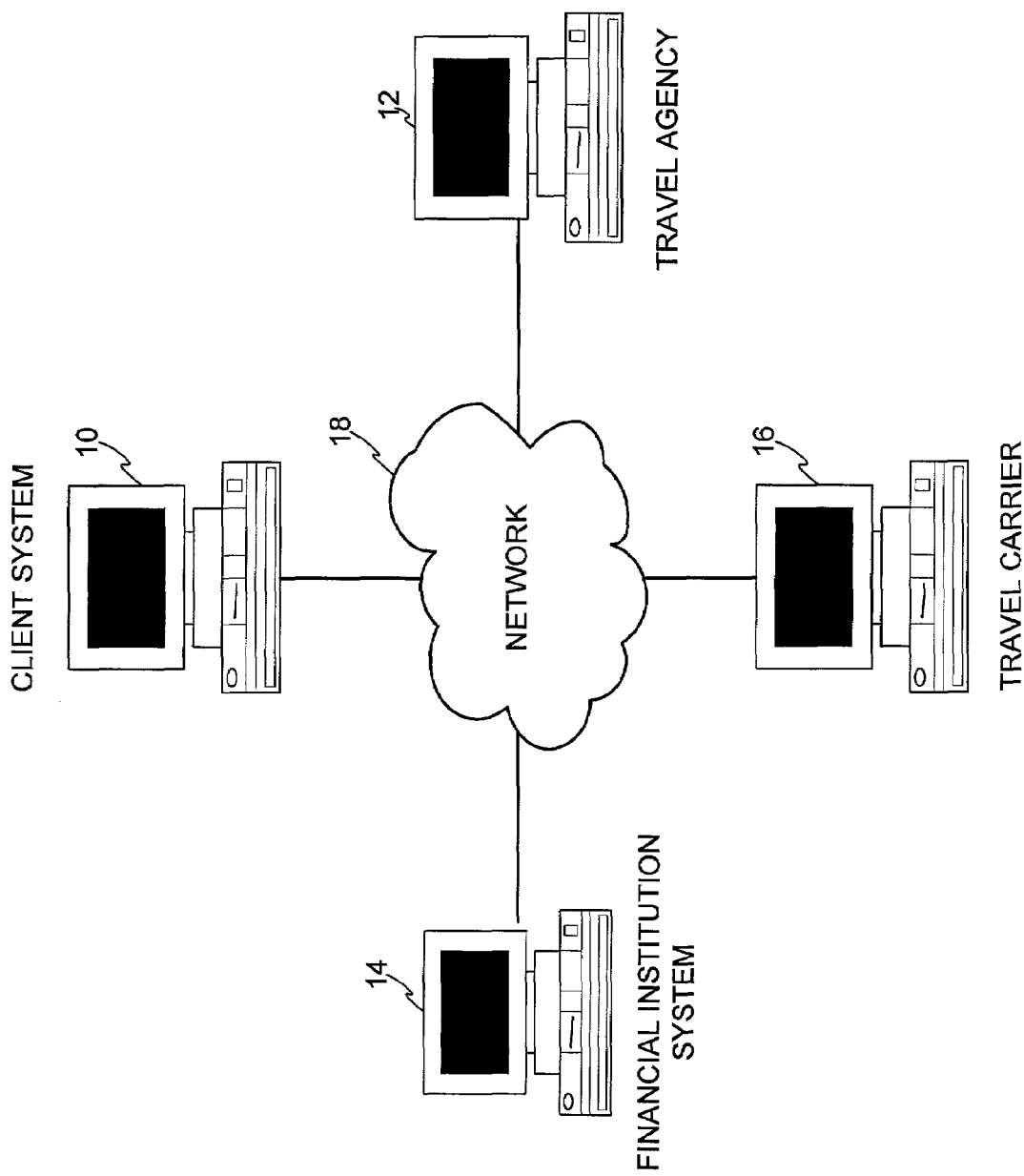
FIG. 1 is a simplified block diagram of exemplary components to the present invention.

Other aspects and features of the present invention will be more fully apparent from the detailed description that follows.

DETAILED DESCRIPTION OF EXEMPLARY EMBODIMENTS

The following descriptions are of exemplary embodiments of the invention, and are not intended to limit the scope, applicability or configuration of the invention in any way. Rather, the following description is intended to provide convenient illustrations for implementing various embodiments of the invention. As will become apparent, various changes may be made in the function and arrangement of the elements described in these embodiments without departing from the spirit and scope of the invention.

The present invention is generally directed to a travel carrier contract management and optimization system and method for analyzing and tracking travel carrier information (e.g., client and contract data) and performing an optimization algorithm to optimize travel costs associated with a large company's (or a plurality of companies') purchase of travel services from travel carriers. In an exemplary embodiment of the present invention, the invention facilitates the processing of information in several phases, such as, for example, (1) a data acquisition and management phase, where data is received/retrieved from multiple sources (e.g., clients, travel agents, financial institutions, the travel carriers, and potentially, other third parties); (2) a data quality phase, where a data quality engine ensures the quality and integrity of received data; (3) a data tracking phase, where electronic contracts are matched with client data; and (4) a savings optimization phase, where an optimization algorithm performs a spend share shift analysis based on, for example, the average sector price by carrier, class of service, route and country of ticketing.

The optimization phase is implemented through a goal programming algorithm, where the objective is to minimize the amount a client spends over a fixed period of time subject to contract conditions and a penalty function that takes into account several factors such as, inter alia, carrier seat capacity, flight frequency and direct/indirect flight routes. An exemplary system of the present invention is able to facilitate the processing of over one hundred variables and thousands of linear constraints in only a few minutes on a computer. Another exemplary system further improves the optimization results by using price weighting factors which introduce non-linear programming methods to achieve better results with only a slightly diminished effect on processing speed. Further, when an air carrier share is maximized during the optimization process, an exemplary system may utilize potential prices (prices adjusted to factor in contract rebates) instead of simple base discount prices.

Thus, the present invention effectively and efficiently shares and exchanges client history data and other information between a client, a travel agent, a financial institution, one or more travel carriers (e.g., airlines), or other third parties. The present invention also facilitates streamlining a client's travel routes to create savings plans or discount packages tailored to the airline routes taken. The invention also overcomes the deficiencies of previous devices and methods, such as those described in U.S. Pat. No. 5,832,453, the contents of which is hereby incorporated by reference, by achieving an optimization model that is more accurate and true to real life environments.

Figure 2:
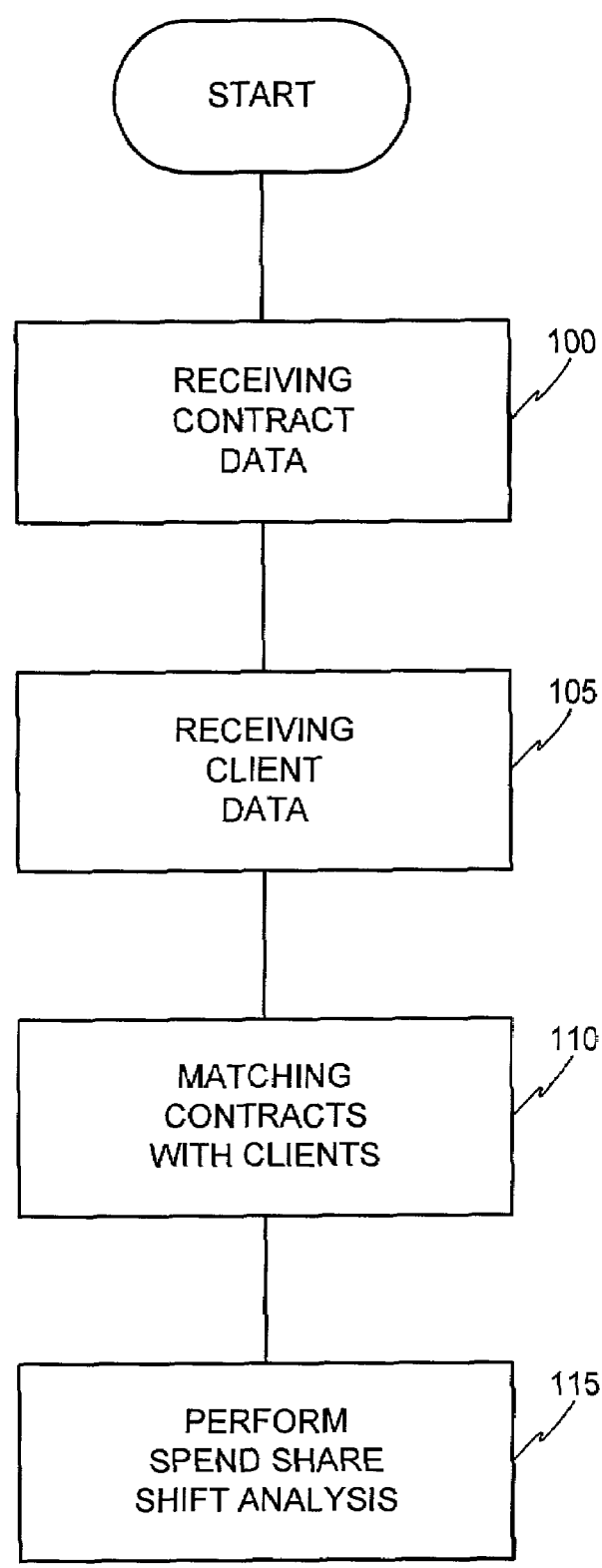
FIG. 2 is a flow chart depicting an exemplary process flow of the present invention.

In an exemplary embodiment, the present invention, as shown in FIG. 1, comprises a client 10 system, a travel agency 12 system, a financial institution 14 system, and a travel carrier 16 system. Information may be exchanged via any suitable network 18, including direct connections, distributed networks, etc. As described more fully below, data from these various sources may be imported and exported as necessary to perform the desired analysis and generate requested optimization results. With respect to exemplary processes of the present invention and by way of a general overview, an exemplary method of the present invention, as illustrated in FIG. 2, comprises the steps of a host system (1) receiving airline contract data (STEP 100), (2) receiving client data associated with a client 10 (STEP 105), (3) accessing the airline contracts saved in electronic form (or manually inputted) to allow matching of the electronic contracts with client data to provide the tracking of savings in airline contracts (STEP 110); and (4) engaging in a spend share shift analysis (STEP 115), by evaluating, inter alia, the average sector price by carrier, class of service, route, country of ticketing, and airline contract conditions, so as to optimize savings through a "goal programming" algorithm configured to minimize the client's spending over a fixed period of time.

It should be appreciated that the host system may reside with the Financial Institution 14, the Client System 10, the Travel Agency 12, the Travel Carrier 16 or with any other third party. Additionally, the host system of the present invention may exist within a single entity, e.g., the Financial Institution 14, or may be distributed between or among several different systems. The host system may include a host server or other computing systems including a processor for processing digital data, a memory coupled to said processor for storing digital data, an input digitizer coupled to the processor for inputting digital data, an application program stored in said memory and accessible by said processor for directing processing of digital data by said processor, a display coupled to the processor and memory for displaying information derived from digital data processed by said processor and a plurality of databases, said databases including client data, contract data, financial institution data and/or like data that could be used in association with the present invention. As those skilled in the art will appreciate, a computer system which may be used herein will typically include an operating system (e.g., Windows NT, 95/98/2000, Linux, Solaris, etc.) as well as various conventional support software and drivers typically associated with computers. The system computer can be in a home or business environment with access to a network. In an exemplary embodiment, access is through the Internet or other distributed network through any web-browser software or other communication package.

Communication between the parties to the transaction and the system of the present invention is accomplished through any suitable communication means, such as, for example, a telephone network, Intranet, Internet, point of interaction device (point of sale device, personal digital assistant, cellular phone, kiosk, etc.), online communications, off-line communications, wireless communications, and/or the like. One skilled in the art will also appreciate that, for security reasons, any databases, systems, or components of the present invention may consist of any combination of databases or components at a single location or at multiple locations, wherein each database or system includes any of various suitable security features, such as firewalls, access codes, encryption, de-encryption, compression, decompression, and/or the like.

A database, datamart, or data set may include any type of database, such as relational, hierarchical, object-oriented, and/or the like. Common database products that may be used to implement the databases include DB2, Microsoft Access, MSSQL, or any other database product. Database may be organized in any suitable manner, including as data tables or lookup tables. Association of certain data may be accomplished through any data association technique known and practiced in the art. For example, the association may be accomplished either manually or automatically. Automatic association techniques may include, for example, a database search, a database merge, GREP, AGREP, SQL, and/or the like. The association step may be accomplished by a database merge function, for example, using a "key field" in each of the manufacturer and retailer data tables. A "key field" partitions the database according to the high-level class of objects defined by the key field. For example, a certain class may be designated as a key field in both the first data table and the second data table, and the two data tables may then be merged on the basis of the class data in the key field. In this embodiment, the data corresponding to the key field in each of the merged data tables is preferably the same. However, data tables having similar, though not identical, data in the key fields may also be merged by using AGREP, for example.

The host system may provide a suitable website or other Internet-based graphical user interface which is accessible by users. In one embodiment, the Internet Information Server, Microsoft Transaction Server, and Microsoft SQL Server, are used in conjunction with the Microsoft operating system, Microsoft NT web server software, a Microsoft SQL database system, and a Microsoft Commerce Server. Additionally, components such as Access or SQL Server, Oracle, Sybase, Informix MySQL, Intervase, etc., may be used to provide an ADO-compliant database management system. The term "webpage" as it is used herein is not meant to limit the type of documents and applications that might be used to interact with the user. For example, a typical website might include, in addition to standard HTML documents, various forms, Java applets, Javascript, active server pages (ASP), common gateway interface scripts (CGI), extensible markup language (XML), dynamic HTML, cascading style sheets (CSS), helper applications, plug-ins, and the like.

The present invention may be described herein in terms of functional block components, screen shots, optional selections and various processing steps. It should be appreciated that such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, the software elements of the present invention may be implemented with any programming or scripting language such as C, C++, Java, COBOL, assembler, PERL, Visual Basic, SQL Stored Procedures, extensible markup language (XML), with the various algorithms being implemented with any combination of data structures, objects, processes, routines or other programming elements. Further, it should be noted that the present invention may employ any number of conventional techniques for data transmission, signaling, data processing, network control, and the like. Still further, the invention could be used to detect or prevent security issues with a client-side scripting language, such as JavaScript, VBScript or the like.

"Client," as used herein includes any software, hardware, company, organization, individual or other entity which contracts with travel carriers, directly or indirectly, for travel services. As the term is used herein, "client" may refer to the customer of the financial institution, the travel agency, or the travel carrier; or any entity who desires to optimize travel carrier purchases and contracting. The client's travel services are often negotiated and managed by travel agencies and/or their financial institution. The "financial institution" may, but does not have to, house the host system which receives and analyzes travel data information. Further, the "financial institution," as defined herein, includes any software, hardware, banking, credit, or other business entity that services its clients' financial and/or travel needs. As noted, the "financial institution" may also provide travel services. An example of a financial institution that also provides its clients with travel services is American Express Travel Related Services Company, Inc. "Travel agency," as defined herein, includes any software, hardware, individual, entity or agency that contracts and negotiates with the travel carriers and/or others on behalf of its clients. As previously noted, it is possible for the travel agency and financial institution to be the same. "Travel carrier" or "air carrier" as those terms are used herein refers to any software, hardware, individual, entity and/or the like the provides or facilitates transportation or travel services, including airlines, bus companies, train companies, and/or the like. Although the present invention is described primarily in terms of an airline travel carrier, one skilled in the art will easily appreciate that the invention is not so limited.

The optimization model, which will be discussed in greater detail later, includes the following industry terms and phrases. A travel "segment," which includes a particular airline (or other travel carrier) route between cities. For example, a flight originating in Phoenix (PHX), which stops in Dallas (DFW), in route to Baltimore (BWI) comprises two segments: namely, (1) PHX-DFW, and (2) DFW-BWI. The phrase "class of service" may also be used in the calculation of an optimal travel solution. "Class of service" includes the various types of service offered by the variety of travel carriers, e.g., first class, business class, coach class, which may be divided further by full and discounted fares. When referring to a "ticket origin," the term includes a currency identifying the country or origin and/or the country where the ticket was purchased. An "airport pair" includes two airports that defines, for example, the point of origin and destination, or the point of origin and stop-over. For example, the segment PHX-BWI is an airport pair. "Client spend" or simply "spend" include the amount of money spent by a particular client for particular travel services. It is an objective of the present invention to minimize or optimize the client spend.

An exemplary embodiment of this invention contemplates particular "sectors" of travel, where each sector is multi-dimensionally defined to include the air carrier, airport pair, ticket origin and class of service. In defining each sector in this manner, the number of sectors can increase rapidly where more than 10,000 sectors may be considered in a typical computational model. This sector definition is different from known optimization methods which have limited "sector" to a function of only the airport pair and the air carrier code. Similar to the "sector" definition, an exemplary algorithm employed by the present invention considers functional constraints on a four-dimensional basis. For example, in an exemplary embodiment, a constraint of the present invention may include that the sum of a series of sectors defined by different airport pairs, air carriers, origins and classes of service be more than a specific number. Similarly, it may factor in the fact that the global spend of a series of sectors be more than a specific amount. In this manner, the number of constraints increases rapidly wherein a typical problem may consider more than 100,000 constraints. Although the sector definitions and mathematical algorithm definitions have described four-dimensional calculations, it should be appreciated that fewer or more constraints and parameters may be employed depending on the particular modeling objective. For example, the present invention may calculate optimal results based on more narrowly or broadly defined sectors and algorithms.

An exemplary algorithm of the present invention does not require that the ticket price be fixed at the start of the algorithm; however, a fixed ticket price is contemplated by another embodiment of this invention. In fact, in an exemplary embodiment, a non-linear programming element is introduced where the price is not fixed, but is a function of the number of tickets assigned to a specific air carrier. That is, it may be equal to the "potential price" instead of the "base price" if the goal programming algorithm maximizes the current air carrier sectors (i.e., the number of assigned sectors are more than the actual number of sectors). Conversely, if the assigned sectors are less than or equal to the actual number of sectors, the "base price" is used instead of the "potential price." This dynamic pricing structure allows consideration of the effect of the rebates/discounts on the average price.

An exemplary embodiment of the present invention also contemplates a "penalty function," which includes a maximum potential capacity that is assigned to each air carrier for each sector in order to limit the air carrier with, for example, a low level of service, no direct connections, etc. In an exemplary embodiment, the algorithm is able to accept a specific limit to block the increase of the share of each air carrier. As such, depending on its capacity or "penalty function," an exemplary system of the present invention adds a constraint for each cell to fix the maximum number of tickets that may be assigned to each air carrier.

Exemplary input data sets include the following:

Client "flight data," which includes the actual number of purchased tickets by sector forecasted to the future. The sum of purchased tickets for the sectors defined by the same Airport Pair, Ticket Origin and Class of Service is to be considered as the future client demand of trips.

"Ticket prices" are obtained by considering (1) the published fares which may be collected by an external data provider, and (2) the savings and rebates computed by considering the specific contract agreement established between the air carriers and the client. Savings and rebates, which are used, in part to define the price of a ticket, are considered as function of the number of sectors. In fact, many air carriers define periodical rebates that are function of the number of tickets or of the client spend level. As such, the system of the present invention is configured to consider at least two prices for each cell: (1) a "base price" equal to the actual discounted price obtained without a specific rebates, and (2) a "potential price" equal to the ticket price obtainable by maximizing the spend on the current Air Carrier to maximize the periodic rebate. The "potential price" is equal to the "base price" plus the obtained rebate divided by the maximum number of tickets which can be "shifted" to the current Air Carrier.

An air carrier potential capacity ("penalty function") is computed from a complete Flight schedule data set. The Air Carriers with low level of service, in terms of number of seats and number of flights, or without direct connection, are limited with a Penalty Function. This Penalty Function is useful to guarantee a good level of service and an optimal flight plan realistically applicable.

The present invention has the capability and flexibility of being configured to take into account additional specific constraints that may be added by an analyst, such as market share constraint, specific contract thresholds, etc., or, to the contrary, to block the decrease of a specific air carrier in each cell. In another exemplary embodiment, an upper and/or lower limit may be added to a group of cells comprising more than one air carrier.

The present invention performs the travel optimization analysis by receiving, inter alia, one or more of the various input parameters described above, which relate to a client's travel needs and historical usage. As such, the system of the present invention operates using client information collected from one or more sources. For example, this client information may include (i) the types of travel carrier tickets to purchase, (ii) ways and currencies of payment, (iii) available airline companies, (iv) geographic areas of departure and arrival, and/or the like.

Optimization

The host application performs an optimization analysis by utilizing linear or nonlinear analytical models and processes to evaluate input data and generate optimization output data.

By way of general background, it should be noted that the linear and/or non-linear programming methods implemented herein use mathematical algorithms. The analytical programs are a class of problems with an objective that is a function of a set of decision variables that is to be optimized (maximized or minimized) subject to constraints on those decision variables. These problems may be categorized by the structure of the objective function and the structure of the constraints.

There are many applications of mathematical programs ranging from simple problems (e.g., finding a minimum cost assignment of objects in one set to objects in another set) to complex problems (e.g., finding the schedules for a set of tasks that have resource requirements). The art of modeling real world situations as mathematical programs is typically called "formulating" the mathematical program or formulation. Many situations can be modeled as mathematical programs, and it is difficult to characterize all of them because, in general, these problems may be hard to formulate, large, and hard to solve. For additional background on mathematical modeling and complex solution solving, see SAS (1990-2000) "SAS/OR© User's Guide," SAS Institute, Inc., Winston, W., Operation Research, Wasworth 1998, which is incorporated herein by reference. Indeed, specialized algorithms for solving mathematical programs have been developed that exploit the structure in the problem, thereby simplifying finding a solution. The procedures that focus in this area are defined by the structure of the mathematical program that they solve.

As previously discussed, an exemplary aspect of the present invention involves goal programming optimization, where the objective is to determine the optimal solution for clients contracting with air carriers to minimize cost. A goal optimization algorithm is generally described below which (1) illustrates the algorithm from a process flow perspective (FIGS. 8A-D), and (2) describes an exemplary computational model.

The following non-exclusive exemplary data input parameters may be utilized in the optimization model: (1) data set with tracking data and potential data, (2) Data set with filter data; (3) a default maximum potential allowed for a single Air Carrier on a single route; (4) a maximum potential allowed per each single Air Carrier on a single route; (5) air carriers to fix upper limits; (6) air carriers to fix lower limits; (7) flag of integer or real computation (allowing for fraction of flight sectors); (8) number of minimum sectors and spend to allow cell optimization; (9) flag to print detailed reports and/or the like. From the input parameters, exemplary output variables from the optimization process include: (1) a data set with final solution details; (2) data set with multiple records due to possible data input errors; (3) a series of data sets with benchmarking information between original and optimal solution in order to compute incremental savings and/or the like.

An exemplary goal programming model of the present invention utilizes an automated optimization program that is capable of facilitating linear or non-linear mathematical modelling methods, such as, for example, processing available with the Statistical Analysis System (SAS) (module SAS/OR). Although the SAS system is currently a software component known to provide suitable analytical capabilities, other analytical software solutions, known and yet to be developed, such as SPSS, STATA, MINITAB, Matlab, Mathematica and the like may be suitably employed. An exemplary system and method of the present invention is capable of providing travel clients with an optimal strategy relating to flight distribution parameters.

A mathematical construct which may be employed in carrying out the goal programming and optimization process involves considering "x," which is the vector of all the number of sectors defined by the four dimensions described above. In an exemplary embodiment, the optimization process is subject to one or more of the following functions.

Minimize $p'x$: This equation is the function to minimize "price" (vector p) multiplied by the number of sectors (vector x). Where the price is a not a constant vector but a vector of values which are a function of the number of sectors, (1) the price is equal to the "base price" if the number of assigned sectors is equal or less than the actual number of sectors, and (2) the price is equal to the "potential price" if the number of assigned sectors is more than the actual number of sectors.

$Ax \geq a$: This equation is a constraint to avoid the reduction of some air carriers. The constants matrix A and the constants vector a include that the tickets for some sector defined by the Air Carrier, Airport Pair, Ticket Origin and Class of Service remains at least the same as the actual value.

$Bx \leq b$: This equation is a constraint to avoid the increase of some air carriers. The constants matrix B and the constants vector b include that the tickets for some sector defined by the Air Carrier, Airport Pair, Ticket Origin and Class of Service are limited to the actual value.

$Cx=c$: This equation is a constraint to verify that the sum of sectors for each flight cell remains equal to the actual demand of tickets. The constants matrix C and the constants vector c include that the sum of tickets for sectors defined by the same Airport Pair, Ticket Origin and Class of Service remains the same as the actual demand value.

$Dx=d$: This equation is a constraint to avoid the variation of cells with an insignificant economic value. The constants matrix D and the constants vector d include the tickets for some sector defined by the Air Carrier, Airport Pair, Ticket Origin and Class of Service remain the same of the actual value. This is included for all the sectors defined by the Airport Pair, Ticket Origin and Class of Service when the global number of demanded tickets or the global price value are under some fixed low thresholds. This constraint is useful to avoid the building of an optimal plan requiring the client to shift insignificant amount of tickets.

$Ex \geq e$: This is a set of user added constraints to the minimum number of sectors assigned to a specific air carrier near a specific area. The constants matrix E and the constants vector e include that the sum of tickets for a group of sectors be more then a specific value.

$p'Fx \geq f$: This is a set of user added constraints to the minimum spend value of sectors assigned to a specific air carrier near a specific area. The constants matrix F and the constants vector f include that the sum of tickets for a group of sectors multiplied by the prices be more then a specific value.

$1 \leq x \leq u$ is a constraint to the range of the number of sectors, from vector 1, practically none of the tickets can be moved, but at least one remains in each cell, to the maximum number of a sector reachable by each air carrier considering its air carrier potential capacity.

An exemplary embodiment of the present invention comprises a processing structure that assigns a maximum potential capacity (penalty function) to each Air Carrier per each sector defined by Airport Pair, Ticket Origin and Class of Service which assign a penalty to non-direct flights. This penalty reduces the number of sectors assigned to an air carrier with no direct connection.

An exemplary system and method of the present invention: (1) blocks the shift of tickets for sectors with an insignificant amount of spend or number of sectors; (2) may block the increase or decrease of the share of specific Air Carriers; (3) assigns a penalty to an air carrier with low level of services due to low number of seats or flights, or not-direct connections; (4) considers the rebate effect introducing a non-linear function price (step-function); and (5) includes at least one ticket per route in the final optimal solution.

An exemplary system of the present invention, as previously noted, comprises a processing structure which: (1) represents the client data in a multidimensional datamart where each sector is defined by four dimensions: Air Carrier, Airport Pair, Ticket Origin and Class of Service. In this way the number of sectors increases rapidly, wherein the present system can consider more than 10,000 sectors. Further, the present invention accounts for a constraint defined on a free four-dimensional structure. In other words, for example, a constraint may include that the sum of a series of sectors defined by different Airport Pairs, Air Carries, Origins and Classes of Service are more than a specific number. In this way the number of constraints increases rapidly. As such, a real problem can consider also more than 100,000 constraints. Also, in the present invention, unlike other known programming modalities, the price is not fixed and is a function of the number of tickets assigned to a specific Air Carrier; thus, it is equal to the "potential price" if the number of assigned sectors are more than the actual number of sectors and the programming structure is configured to optimize the current air carrier sector; and it is equal to the "base price" otherwise. This dynamic pricing structure factors in the effect of the rebates on average price.

Data Organization

Figure 3:
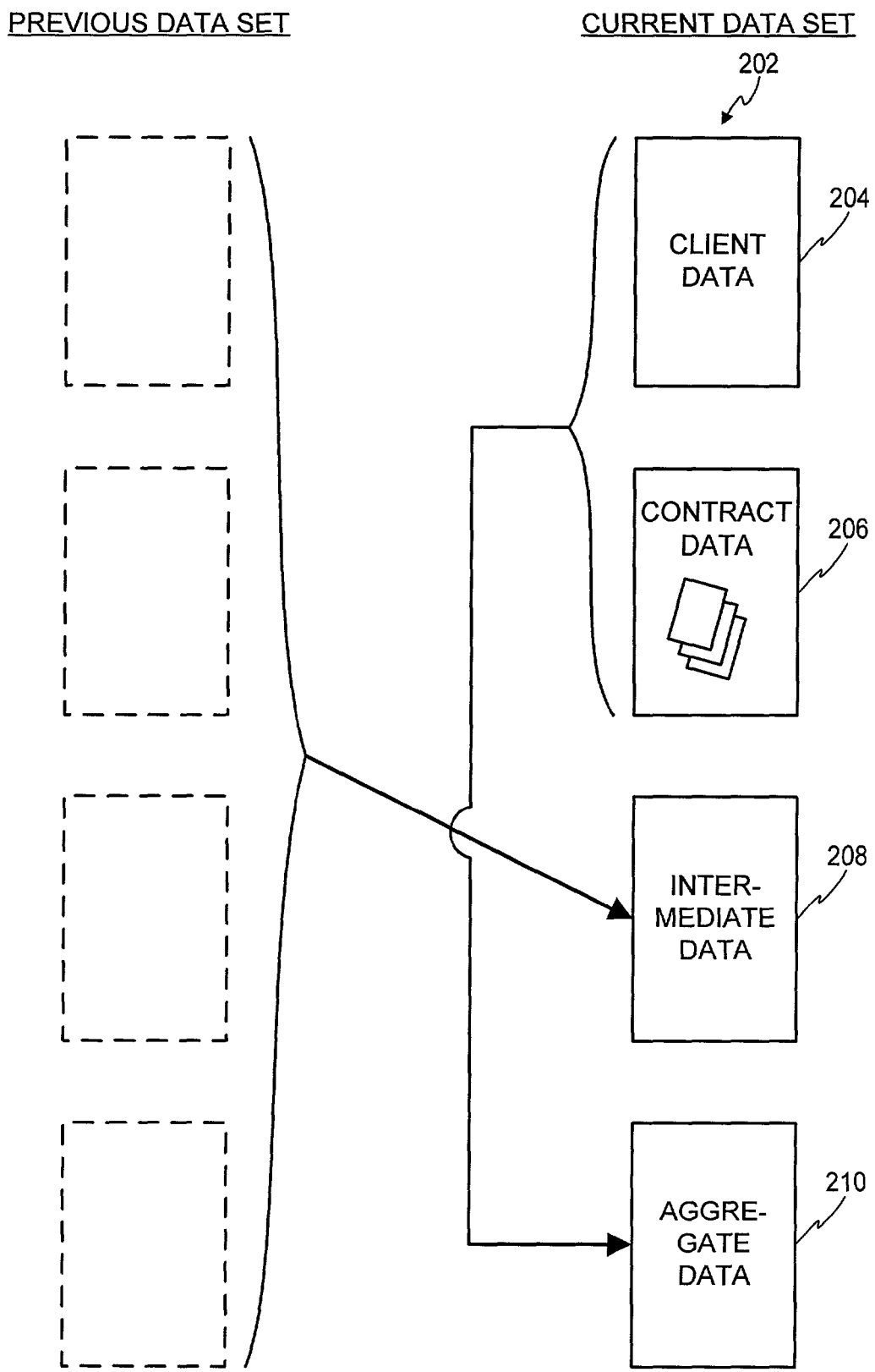
FIG. 3 is a schematic depicting an exemplary data set relationship of the present invention.

Data organization is a part of an exemplary system of the present invention. In an exemplary embodiment, as depicted in FIG. 3, the data structure 202 may be divided (or categorized) into four main directories, (1) a client data directory 204 containing client flight data, (2) a contracts directory 206 containing the files used as anagraphics and a relational database for the client contracts, (3) a relational directory 208 containing intermediate data sets produced from the preceding data sets, and (4) an aggregated directory 210 containing aggregated data sets that are grouped to support multidimensional analysis.

An exemplary client data directory 204 comprises the desired client data to perform the travel carrier analysis. Preferably, each client 10 has a unique dataset which is generated with the same name as a client code. The client code is reference code unique to a particular client. As shown in Table 1 and generally described above, the client data directory 204 may include, among other indicia, one or more of the following:

TABLE 1

| | | |
|---|---|---|
| primary air ticket # | corporate travel ID | ticket credit amount |
| tour type | air ticket date | sequential flight data |
| air carrier code | air ticket currency | airport description |
| booking code | air ticket amount | airline departure and arrival |
| fare basis code | air ticket amount | departure country |
| airport pair | air ticket amount USD | arrival country |
| corporate accounts number | air ticket tax amount | sub-mileage distance |
| | IATA code | |
| | ticket currency code | |

With respect to an exemplary contract directory 206, which contains a relational database, each contract is inputted into different data sets 202. The records in these data sets 202 are logically connected to a univocal key represented by the contract code. As previously noted, a contract code is an identifier that is unique to any particular travel carrier contract. In a preferred embodiment, a condition code and a cell code are used to allow the classification of all the contract's conditions, where each condition corresponds to a single cell. Two exemplary data sets, for example, contain (1) general information about the contract and (2) the heading of the single condition. The first exemplary data set contains the general data of the contract, e.g., the contract code, the label on the contract description, the validity period of the contract and the client code to which it refers. Another exemplary data set contains the data relating to the cost measurement indicia, such as ticket price, ticket currency, percentage of discount, etc. Other exemplary data sets can be configured to take into account: the agency IATA code, the air carrier code, the booking code, the tour type and the tour box information, the destination country code, the fare basis code, the ticket currency code, the eventual IATA currency country, the threshold value and the percentage of the corresponding rebate value. Although a number of contract data set 206 indicia are noted above, this list is not an exclusive list nor does the contract data set 206 necessarily include every indicia listed above. Indeed, the present system is configurable to take into account various programming goals and user preferences.

The contracts directory 206 may also comprise data sets relating to, inter alia, data about the exchange rate for a particular country, with validity data and air ticket currency, data relating to the description of the IATA agency, data relating to country code, description, airport code and area of belonging, data relating to airline company description; booking code description, a data set providing booking code description per class of group on the air companies, and the area description.

Data Acquisition, Correction and Management

Figure 4:
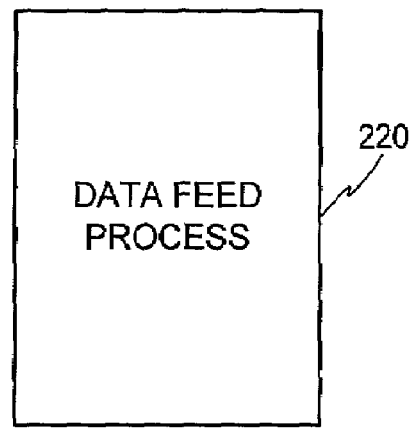
FIG. 4 depicts an exemplary overview of the three phases of data management.
Figure 4:
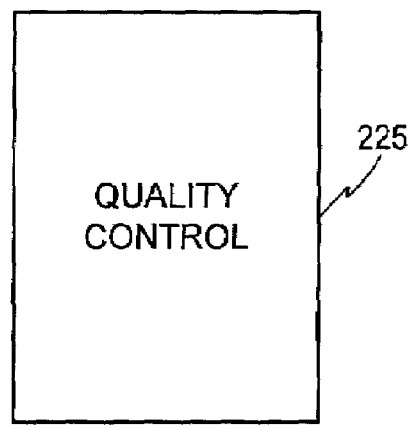
Figure 4:
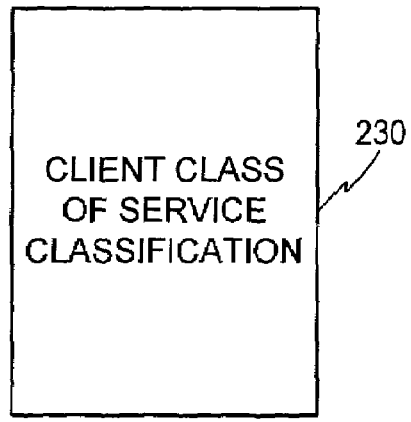

With respect to the data structure 202 described above, one aspect of this invention involves data management devices for collecting, redistributing and correcting the data. As shown in FIG. 4, these devices facilitate three phases of data management, which include (1) data feed (acquisition) 220, (2) quality control/correction of data 225, and (3) client "class of service" classification 230. As such, a data feed process reads data in a pre-designated format from, for example, the client TXT or XLS files. Data may be received from not only the client 10, but also the travel agent 12, travel carrier 16 and the financial institution 14. Further, it is possible that client and/or contract data may be retrieved from sources other than those previously listed.

During the quality control phase, an exemplary embodiment of the present invention is programmed to carry out a series of data correction and/or distribution events. For example, when a "ticket" variable contains a value corresponding to an "open ticket," the variable is updated with one of the five class codes that frequently appear in the client data information. Other correction and quality control features may factor in currency origin, taxes, airport pairs, and/or the like.

During the client class of service classification phase, which, in an exemplary embodiment is found in a "data management menu," variables such as "country pair" and "region pair" may be added to the client data set 204 to facilitate analysis and reporting.

Data quality control in the present invention allows the reporting of error frequency and an estimation of missing data. In an exemplary embodiment, the quality control routine may be carried out either (1) automatically at the time the client data is input, or (2) manually, after the data is acquired.

In an exemplary embodiment, a number of common user interface devices may be used. For example, the interface in a SAS system object oriented programming is organized in user-friendly frames and the outputs are in the form of character based listing, interactive graphics, HTML pages, and data interfaces exportable to Excel.

Simulation and Optimization

Figure 5:
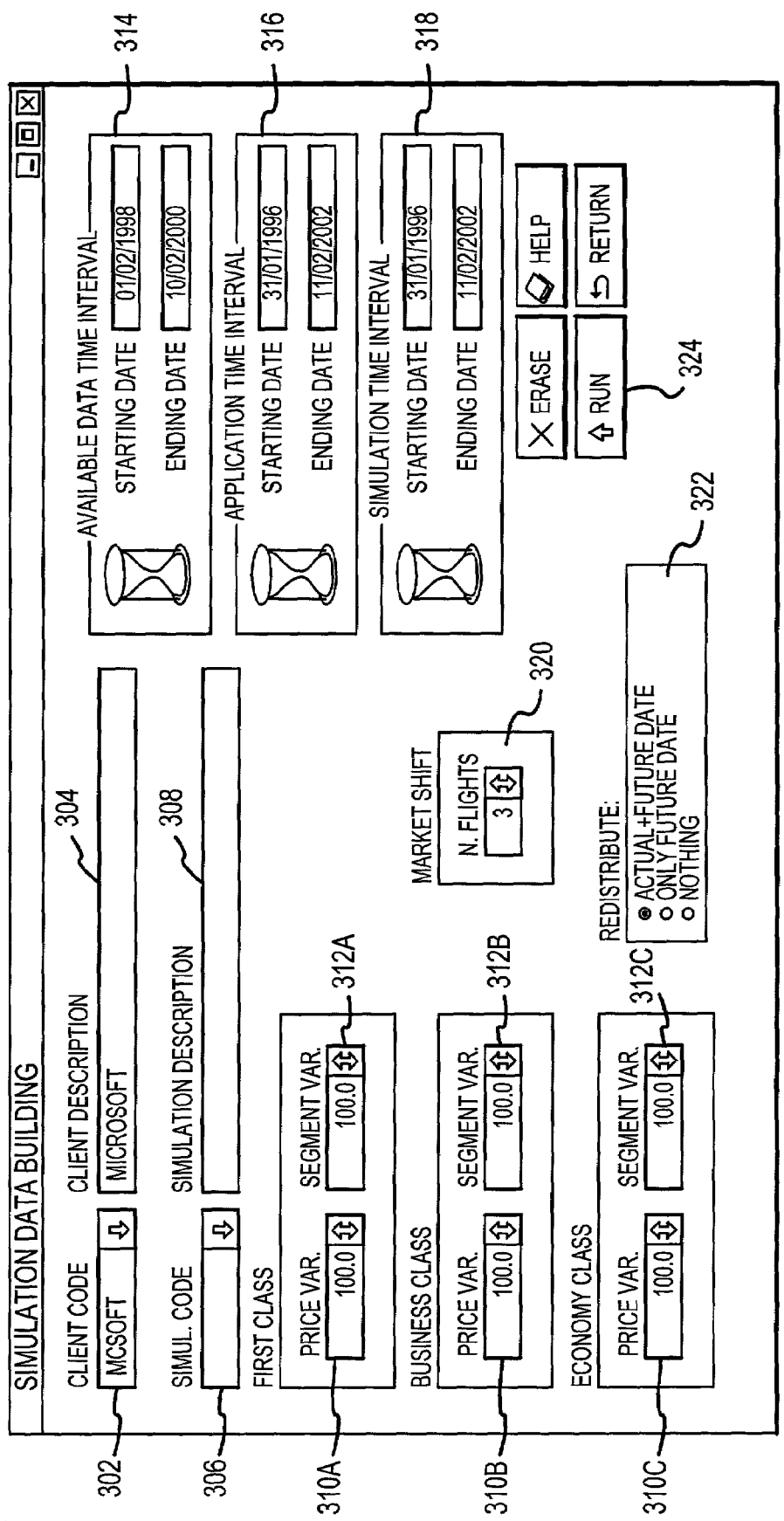
FIG. 5 is a exemplary user interface screen shot depicting a data simulation data building screen defined, in part, by class of service and time availability.

After the requisite data sets 202 (FIG. 3) have been acquired, the system performs a simulation and optimization process in accordance with the previously identified analytical programs, by first identifying input parameters, as illustrated in the screen shot depicted in FIG. 5. As such, an exemplary embodiment of the present invention comprises the following fields and selections, which may be selected and/or inputted through any user interface method or means, e.g. html screen and tcp/30 connects. Client code 302 is the client code from which to base the simulation. Client description 304 is the input field to enter the description of the client. Simulation code 306 is a simulation code selection from the available simulation codes. Simulation code description 308 is an input field to enter the description of a new simulation. Class of service price variation 310A-C is the percentage variation of the ticket price distribution for the particular class. Class of service segment variation 312A-C is the percentage variation of the segment distribution. Available data time interval 314 is the maximum interval of real data currently available into the client segment data sets. Application time interval 316 is a subset of the available period used to build the simulation data set. Simulation time interval 318 is the time interval desired. This interval may be included, excluded or may overlap the available time period 314. Market shift 320 is the number of flights used to compute the market shift percentage; in this regard, an airport pair is considered sharable only if at least the number of alternative air carrier flights is reached. The redistribution radio box 322 defines the redistribution mode, where if the "actual+future data" button is selected, all of the data included in the simulation period are redistributed. If "only future data" is selected, only the data included in the simulation period and with a time in the future are redistributed. The redistribution process duplicates or deletes some tickets, following a casual order, to align data to the desired distribution.

Figure 6:
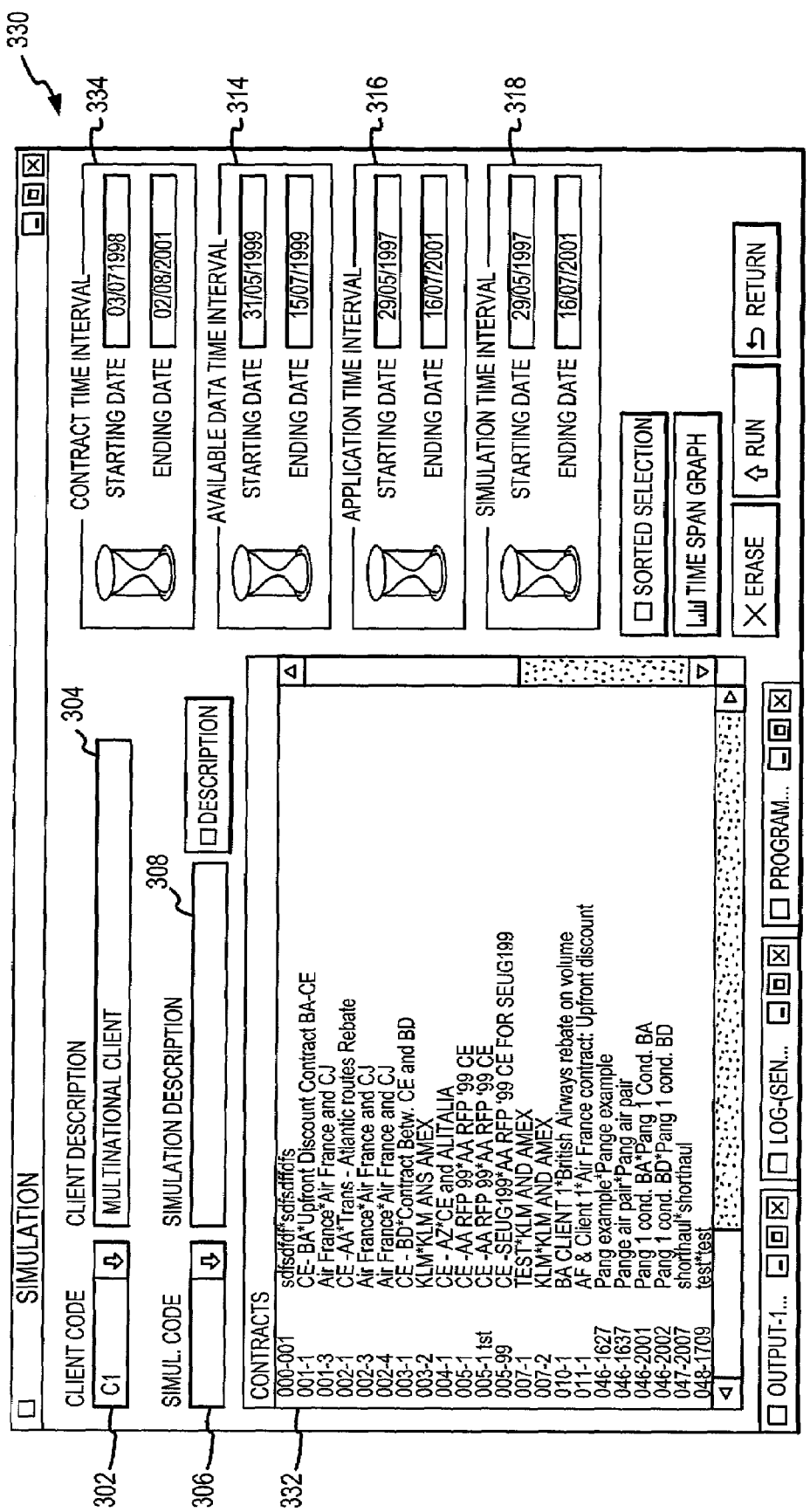
FIG. 6 is an exemplary user interface screen shot depicting a simulation screen including contract designation fields.

Upon selecting the run button 324 (FIG. 5), a new simulation frame 330, as illustrated in FIG. 6 appears. This simulation frame 330 includes a contract field list box 332 containing all the contracts that can be used to estimate data from the contact tracking frame (not shown). The contract time interval 334 allows the user to select the contract time span.

Goal Programming Optimization

Figure 7:
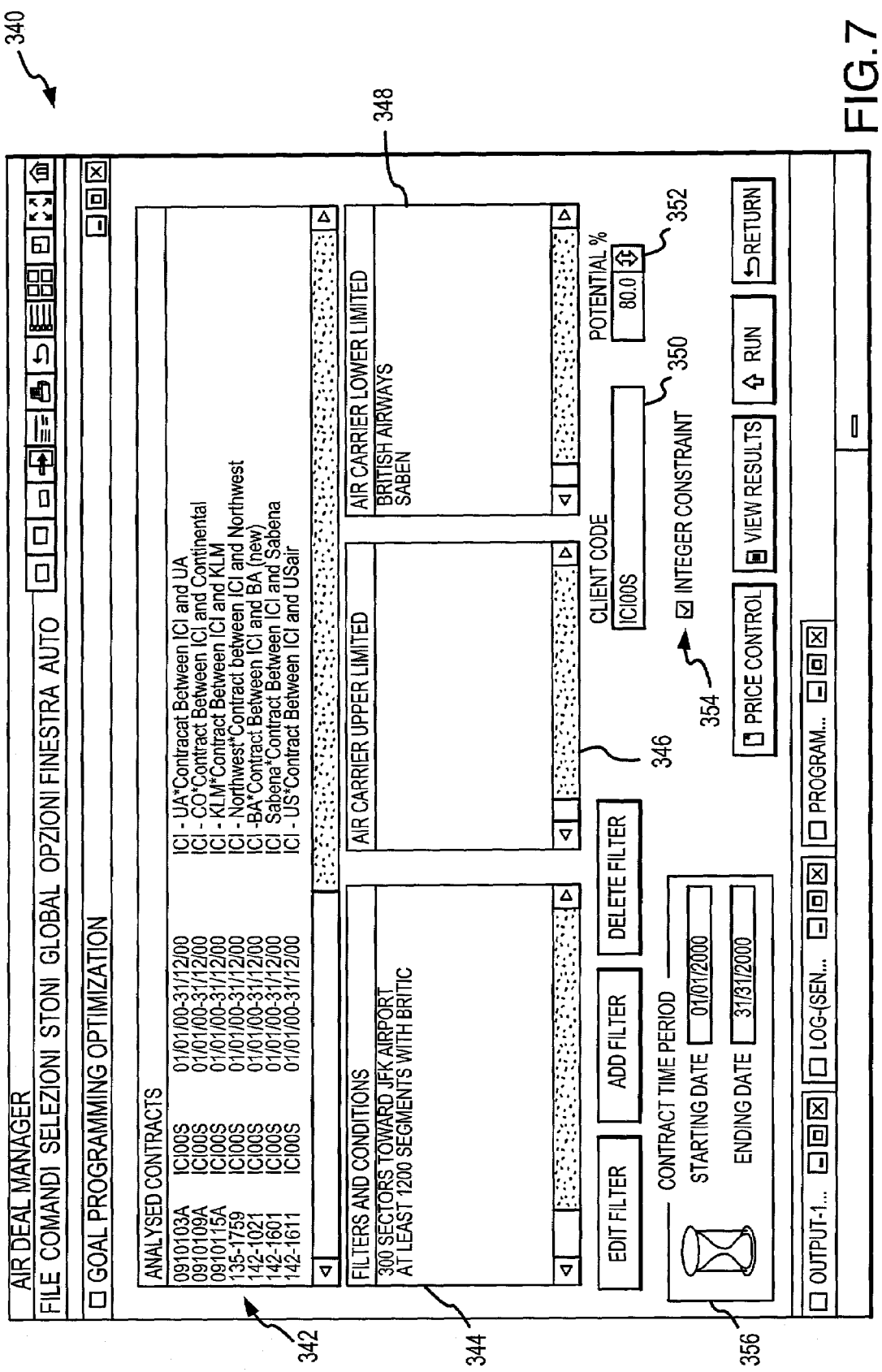
FIG. 7 is an exemplary user interface screen shot for the goal programming optimization features.

The goal programming optimization frame 340, illustrated in FIG. 7, allows the user to find the optimal solution to minimize client flight costs. To reach this goal, the system utilizes a goal programming methodology which permits the introduction of added constraints. In particular, in an exemplary embodiment, the user is able to add user-defined filters and/or conditions 344 to fix the minimum amount of sectors or global spend regarding a set of flight cells. For example, in an exemplary embodiment, it is possible to configure the goal programming algorithm to find an optimal solution with at least 1200 segments associated with a selected air carrier toward JFK airport (New York City). Additionally, an exemplary embodiment forces the goal programming algorithm to limit the maximum number of sectors actually reached by a series of specifically selected air carriers in all the client flight cells. These air carriers may only decrease or increase their spend quote. The "goal programming optimization" in FIG. 7 depicts four list boxes. The analyzed contracts 342 list box show the contracts from the contract tracking frame used to estimate data. As previously noted, the filter and conditions 344 show the added filters defined by the user to limit the lower bound sectors or the spend on one or more air carriers. Air carrier upper 346 and lower 348 limits are the air carrier codes whose upper or lower bound sectors are fixed to the actual numbers of already covered sectors (using the actual client value). Depending on selection of upper or lower limits the air carrier can only reduce or increase their spend within each cell.

In an exemplary embodiment, the goal programming optimization frame 340 also contemplates four additional fields. The client code 350 is the same code carried over from the contract tracking analysis. The default potential 352 is the maximum percentage of client flights covered by a single air carrier within each cell where there are at least two different air carriers. The inner program considers air carrier coverage built over a flight schedule data set, and then limits the obtained value to this maximum potential parameter. Reducing this parameter, the user reduces the possible air carrier global spend. By increasing these parameters, the air carrier coverage does not automatically increase; it increases only if its maximum coverage built over the flight schedule is more than these parameters. The starting and ending date 356 is the starting and ending date of the period used to run the contract tracking analysis. The "integer constraint" check box 354 activates an integer goal programming algorithm that avoids solutions with a fraction of some sectors.

As just shown, the present invention is described herein with reference to screen shots, block diagrams and flowchart illustrations of methods, apparatus (e.g., systems), and computer program products according to various aspects of the invention. It will be understood that each functional block of the block diagrams and the flowchart illustrations, and combinations of functional blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

The goal programming optimization algorithm uses and produces various tables in developing the client's optimal solution. For example, an exemplary embodiment comprises three process control tables which include (1) a last contract tracking details table, (2) an air carrier distribution table, and (3) a solution summary table. The last contract tracking details table is a data set comprising most of the information used by the goal programming optimization algorithm. For each single cell defined by the airport pair, ticket currency, class group and air carrier, the data table shows information fields obtained by the contract tracking analysis.

The air carrier distribution table is a secondary data table obtained from the optimization which describes some fields regarding the solution and aggregated with respect to air carrier, class group, and ticket currency.

The "solution summary" table is a technical data table which controls the amount of spend in the obtained solution. It is reduced by the system to take into account a situation where a potential rebate may be reached only when the air carrier spend increases.

In an exemplary embodiment of the present invention, the goal programming optimization algorithm produces four result data tables: (1) a benchmark summary table, (2) an air carrier summary table, (3) a benchmark table, (4) a solutions table.

The "benchmark summary" table includes a data set that presents the final solution results with respect to the actual client spend. The principal fields are the "global USD amount," which includes the client's actual spend; and, the "final Optimal USD "amount" which is the client spend obtained from the proposed solution and the difference between these two fields. This table also shows "actual average price" and the "optimal solution average price" and the difference between these two fields. The total spend amount obtained here does not necessarily correspond to the real client spend if the origin and destination data feed is not used.

The "air carrier summary' includes a data table which reports a summary relating to the air carriers. This table presents fields as "final optional sectors," air carrier USD sectors" and their difference. It also shows final optional amount," actual "air carrier USD amount," and their difference; and "potential air carrier sectors" and the "potential air carrier amount."

The "benchmark" data table includes a more detailed data table showing the proposed solution aggregated by airport pair, ticket currency, and class group, excluding the air carrier. This table presents fields as "final optimal sectors," actual "global USD sectors" and their difference. This table also shows "final optimal USD amount," actual "global USD amount" and their difference. Two additional fields, "savings rank" and "first 80% of savings," select the main cells whose savings cover at least 80% of the global savings, and are sorted in order of importance.

The "solution" table represents the final solution proposed by the system of the present invention. This table comprises "potential" and "selected price in the optimal phase" results. The "potential" result is the potential obtained from a flight schedule data set and is limited by the "potential" field. The "selected price" is the price used during the optimization phase which takes into account the potential maximum rebate of the air carrier.

With reference to FIGS. 8A-D, an exemplary detailed process flow, depicting exemplary "Input," "Outputs" and "Algorithm" steps are illustrated and described. First, available data is selected from potential input parameters 550 and which is available in a client database 552 with actual and potential data (STEP 601). The data may then be processed in a data quality control processing phase (STEP 602) which saves possible double/multiple records to a database 554, thereby allowing further checks in the event that data cells are covered by more than one contract. This then sums rebates double or multiple records due to more than one contract relating to the same cell, while checking possible data error. The data is then prepared and rebates subtracted from spend to compute a "base" net-sector price before the analysis (STEP 603). An Air Carrier maximum potential capacity for each route (or penalty function is added (STEP 604). This value, which is derived from the OAG data set or flight schedule data set, is the maximum potential that a single Air Carrier may cover per each route. Next, the global monetary (e.g., U.S. currency) rebate by cell is computed, wherein the cell is defined by airport pairs, class of service and ticket currency of origin (STEP 605).

Moving to FIG. 8B, the global base spend, which may include or exclude rebates is computed (STEP 606) using, for example, an iterative programming methodology. In general, rebates are taken into account only if the spend on the corresponding carrier is increased through the optimization process. Data is next prepared for the goal programming solution, where constraints are built and air carrier upper or lower limits are added to fix the spend and/or sector boundaries for each carrier (STEP 607). This data may be retrieved from constraint databases comprising an upper limit data set 558 and a lower limit data set 560. Based on the penalty function of each air carrier, added during STEP 604, a maximum potential number of sectors in derived (STEP 608). In referencing a tickets data set 562, the lowest value cells from the optimization is excluded to avoid shifting very low number of sectors or spend (STEP 609). A maximum potential limit correction is calculated for each air carrier and cell where (1) the value 1 (as 100 percent potential share shift) is used for cells with only one flight, (2) the actual global number of flights is used if it is more than the maximum air carrier potential (the actual air carrier share is used when the potential is less), (3) the default potential is used when the air carrier potential is more, and (4) otherwise, the actual air carrier potential built using schedule flights is used (STEP 610).

Figure 8A:
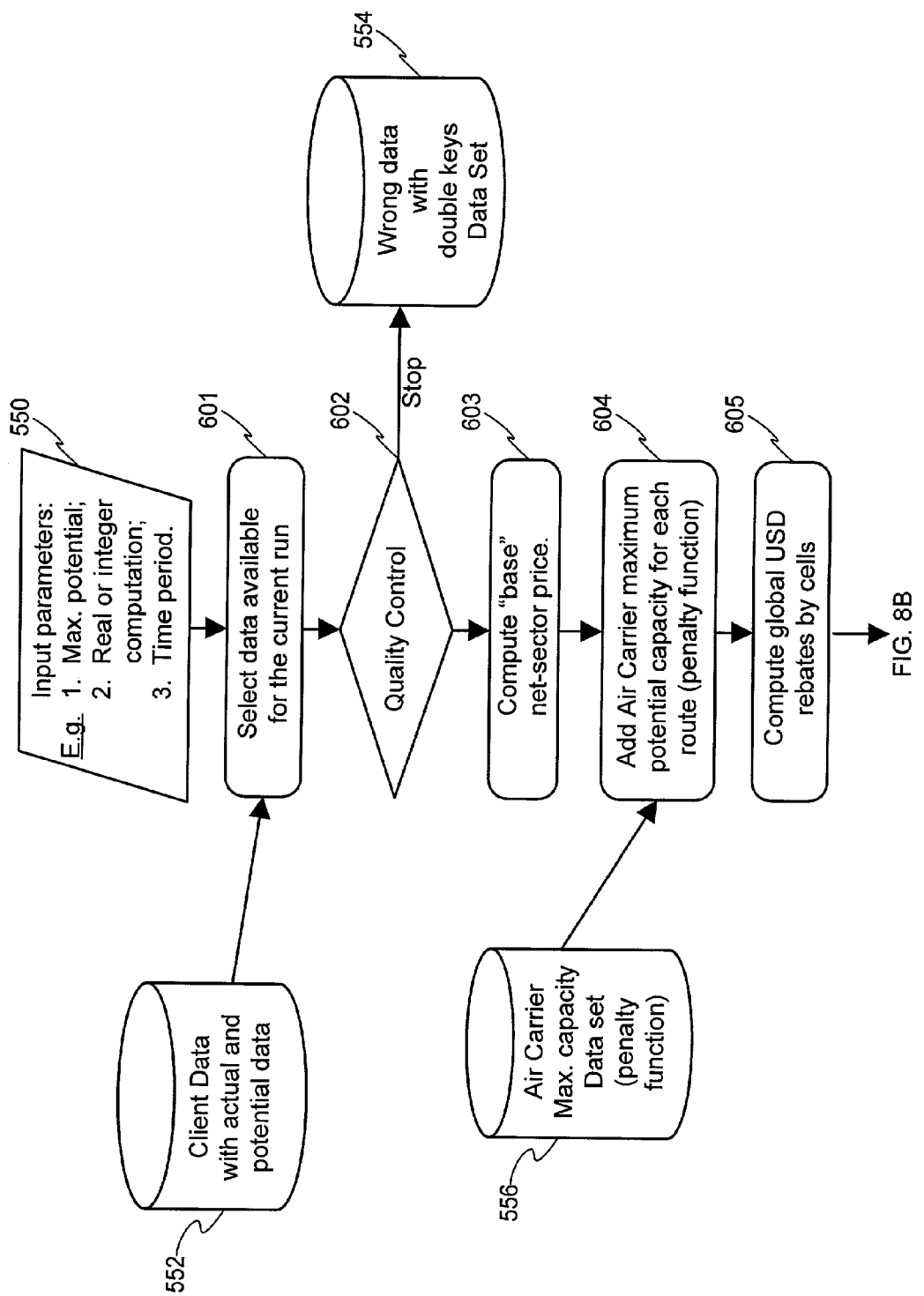
Figure 8C:
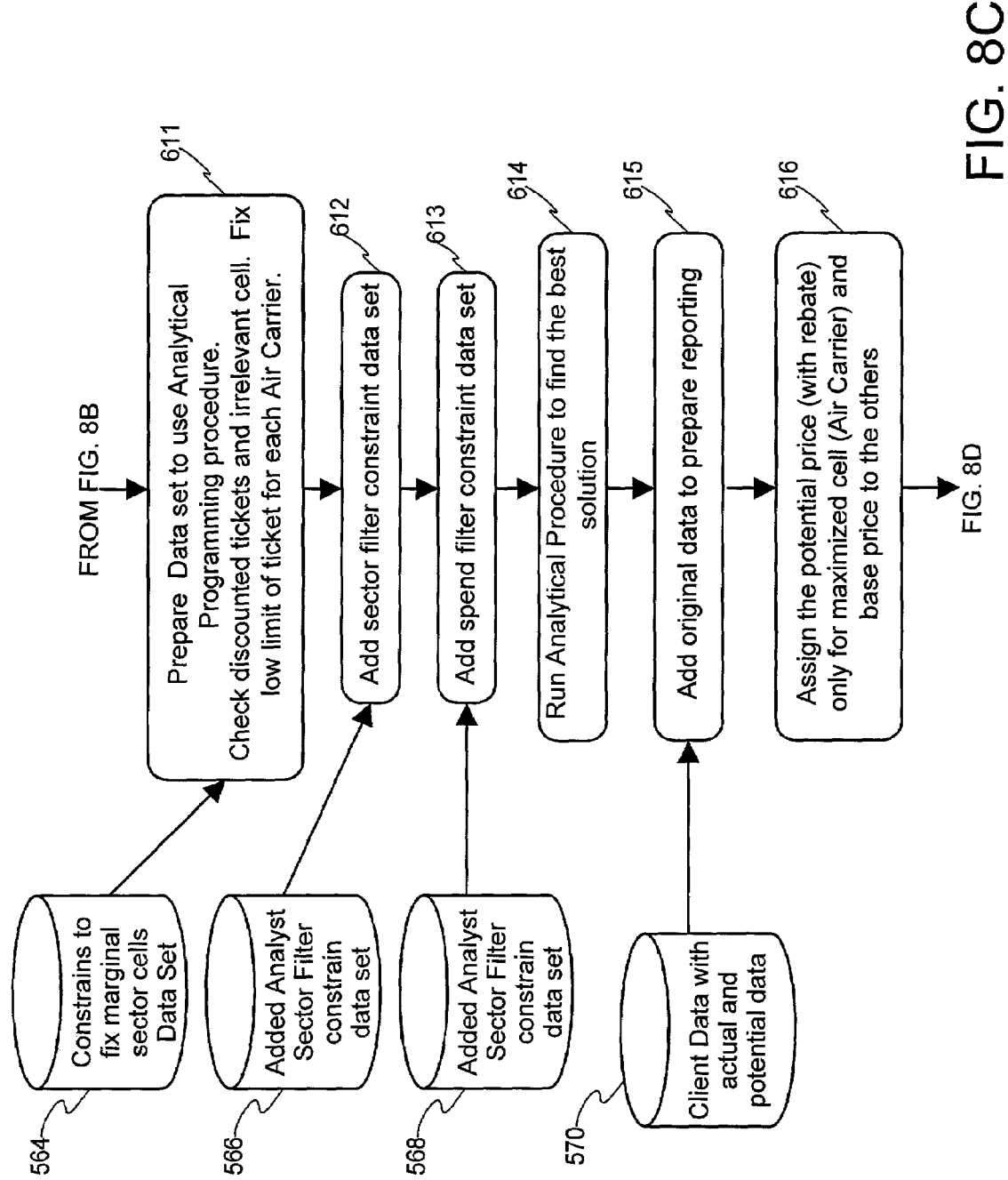

Referring to FIG. 8C, by accessing a data set 564, comprising constraints to fix marginal cells, a SPARSEDATA data set (SAS data structure comprising the details of the model and of the constraints) is prepared to utilize the SAS System goal programming procedure, which uses the constraints defined, to minimize spend. In particular, the algorithm applies to data quality control to remove very low ticket prices or adjust the average sector price to the mean value (STEP 611). A sectors filters data set 566 is then added to the SPARSEDATA data set (STEP 612); and a spend filters data set 568 is added to SPARSEDATA data set (STEP 613). The SAS goal programming system is executed to find the best solution (STEP 614). In an exemplary embodiment, the original data from the client data set 552 is then added to the solution to prepare the reporting script (STEP 615). A potential ticket price, which is computed considering the potential rebate due to a strong share shift versus the current air carrier, is assigned to the air carrier for each cell where the goal programming algorithm maximizes its share. The actual base price is assigned to the air carrier for each cell where the goal programming algorithm is minimized (STEP 616). The optimization process can run again with these consolidated final prices.

Figure 8D:
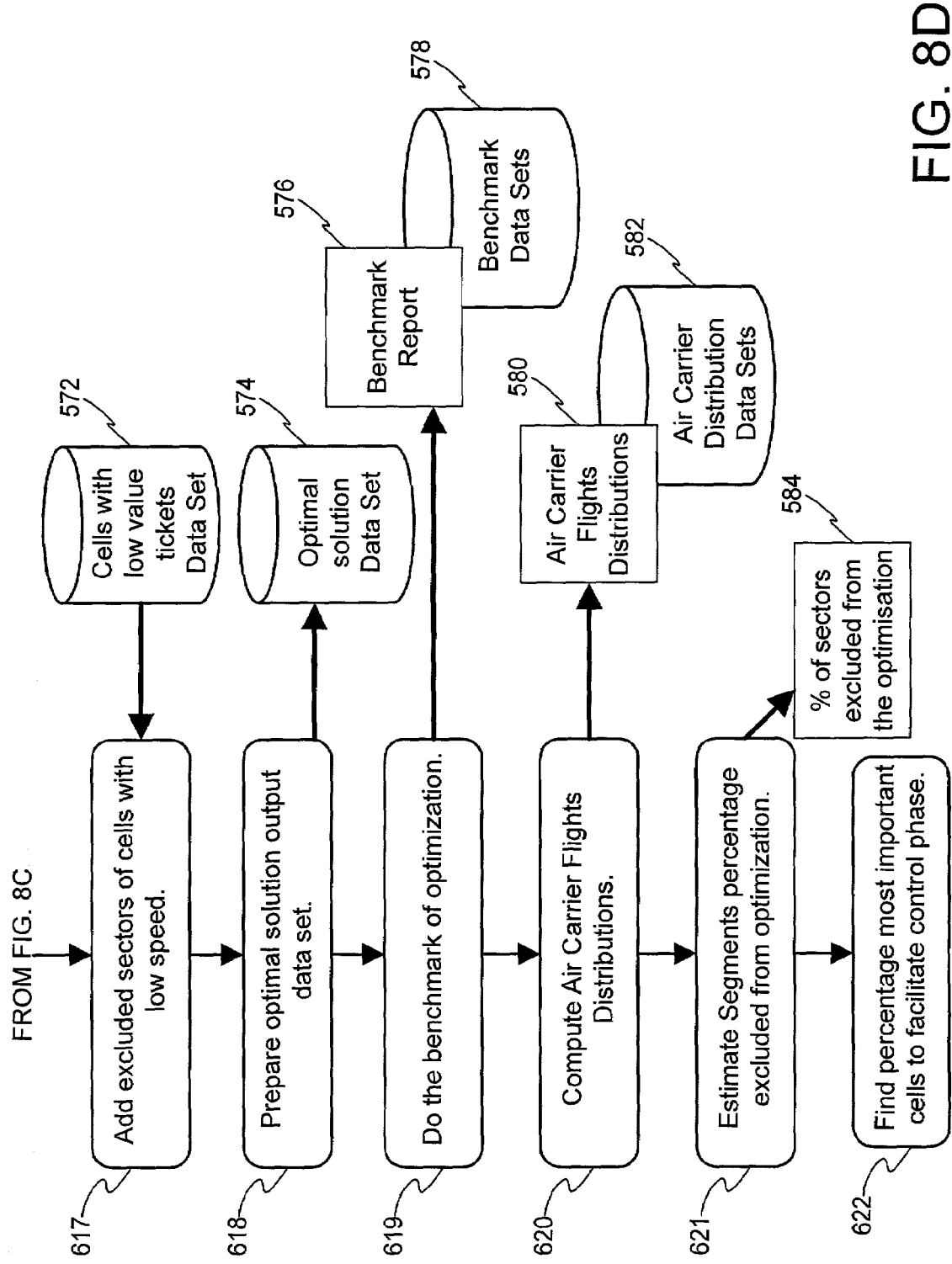

Referring to FIG. 8D, the excluded sectors with low spend is added from the low value ticket data set 572 to the solution (STEP 617). The final reports are then prepared with the optimal solution data sets (STEP 618) and saved to the optimal solution data set 574. A benchmark for the optimization is then performed, creating an optimal solution benchmark data set detailed by cells and an optimal solution benchmark data set with average per sector; a report 576 is created and then saved to the benchmark data set 578 (STEP 619). The air carrier flights distribution 580 is computed (STEP 620) and saved to the appropriate data set 582. The estimate of the segments percentage excluded from optimization 584 is determined (STEP 621), and cells that cover, e.g., 80 percent of the spend are identified and sorted by, e.g., descending order.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as critical, required, or essential features or elements of any or all the claims. As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as "essential" or "critical".

It should be appreciated that the particular implementations shown and described herein are illustrative of the invention and its best mode and are not intended to otherwise limit the scope of the present invention in any way. Indeed, for the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical electronic transaction system.

We claim:

1. A travel carrier contract management and optimization method, comprising the steps of:
   receiving travel contract data relating to a travel carrier contract, wherein said travel contract data includes at least two of volume, segments, volume share, segment index, volume index, contract code, contract description label, contract validity period, referred client code, cost measurement indicia, agency International Air Transport Association (IATA) code, carrier code, booking code, tour type, tour box information, destination country code, fare basis code, ticket currency code, eventual IATA currency country, threshold value, and percentage of corresponding rebate value;
   receiving client travel data associated with a client, wherein said client travel data includes at least two of primary ticket number, tour type, travel carrier code, booking code, fare basis code, travel port pair, corporate accounts number, corporate travel ID, ticket date, ticket currency, ticket amount, ticket amount in US dollars, ticket tax amount, IATA code, ticket currency code, ticket credit amount, sequential travel data, travel port description, travel departure, travel arrival, departure country, arrival country, and sub-mileage distance;
   matching said travel contract data with said client travel data;
   defining a plurality of sectors from said client travel data, wherein said plurality of sectors comprises a travel carrier, travel port pair, ticket origin, and class of service;
   determining a sector price for each of said plurality of sectors, wherein a potential price is considered when a number of said plurality of sectors that are assigned exceeds an actual number of sectors and a base price is considered when a number of said plurality of sectors is less than or equal to said actual number of sectors;
   generating a constraint from said plurality of sectors, said client travel data and said travel contract data;
   wherein said generated constraint comprises at least two of segment data, class of service data, travel port pair data, sector data, travel carrier data, client travel spend, and market share derived from said client travel spend and said sector data;
   generating a penalty function constraint based on said travel contract data, wherein said penalty function constraint limits travel carrier values per sector according to travel factors, wherein said travel factors include evaluating a maximum potential capacity per carrier and at least one of carrier seat capacity, flight frequency, quality of service, and availability of direct connections per sector;
   performing a spend share shift analysis based on said sector price, said generated penalty function constraint and said generated constraint;
   utilizing goal programming to optimize said client travel spend based on said spend share shift analysis; and,
   creating a report based on said optimized client travel spend.

2. The method of claim 1, wherein said performing step further comprises configuring an analytical solutions software to facilitate said spend share shift analysis.

3. The method of claim 2, wherein said analytical solutions software is at least one of statistical analysis system (SAS), SPSS, STATA, MINITAB, Matlab, and Mathematica.

4. The method of claim 1, further comprising creating an objective function to evaluate said generated constraint, wherein said objective function facilitates optimization of said client travel spend.

5. The method of claim 1, further comprising configuring a price weighting factor.

6. The method of claim 1, further comprising generating potential prices.

7. The method of claim 1, further comprising evaluating an average sector price by at least one of: travel carrier, class of service, route, country of ticketing, and travel contract conditions.

8. The method of claim 1, further comprising configuring said generated constraint by adding a series of sectors.

9. The method of claim 1, further comprising fixing a ticket price.

10. The method of claim 1, further comprising determining a potential price; wherein said potential price comprises a ticket price as a function of a number of tickets assigned to a specific travel carrier.

11. The method of claim 1, further comprising benchmarking said optimized client travel spend with an original solution to compute incremental savings.

12. The method of claim 1, wherein said client travel data is received from a travel agency system.

13. The method of claim 1, wherein said travel contract data is received from a travel carrier system.

14. A system configured to facilitate travel carrier contract management, comprising:
   a data acquisition component configured to facilitate acquisition of travel contract data and client travel data;
   wherein said travel contract data includes at least two of volume, segments, volume share, segment index, volume index, contract code, contract description label, contract validity period, referred client code, cost measurement indicia, agency International Air Transport Association (IATA) code, air carrier code, booking code, tour type, tour box information, destination country code, fare basis code, ticket currency code, eventual IATA currency country, threshold value, and percentage of corresponding rebate value;
   wherein said client travel data includes at least two of primary ticket number, tour type, travel carrier code, booking code, fare basis code, travel port pair, corporate accounts number, corporate travel ID, ticket date, ticket currency, ticket amount, ticket amount in US dollars, ticket tax amount, IATA code, ticket currency code, ticket credit amount, sequential travel data, travel port description, travel departure, travel arrival, departure country, arrival country, and sub-mileage distance;
   a processing component configured to define a plurality of sectors from said client travel data, wherein said plurality of sectors comprises a travel carrier, travel port pair, ticket origin, and class of service;
   said processing component configured to determine a sector price for each of said plurality of sectors, wherein a potential price is considered when a number of said plurality of sectors that are assigned exceeds an actual number of sectors and a base price is considered when a number of said plurality of sectors is less than or equal to said actual number of sectors;
   said processing component configured to generate a constraint from said sector, said client travel data and said travel contract data;
   wherein the generated constraint comprises at least two of segment data, class of service data, travel port pair data, sector data, travel carrier data, client travel spend, and market share derived from said client travel spend and said sector data;

said processing component configured to generate a penalty function constraint based on said travel contract data, wherein said penalty function constraint limits travel carrier values per sector according to travel factors, wherein said travel factors include evaluating a maximum potential capacity per carrier and at least one of carrier seat capacity, flight frequency, quality of service, and availability of direct connections per sector;

said processing component configured to facilitate a spend share shift analysis based on said sector price, said generated penalty function constraint and said generated constraint;

and configured to utilize goal programming to optimize said client travel spend based on said spend share shift analysis; and, a reporting component configured to create a report based on said optimized client travel spend.

15. The system of claim 14, further comprising a data storage component configured to facilitate hosting at least one of a client travel data directory, a contracts directory, a relational data directory, and an aggregated data set directory.

16. The system of claim 14, wherein said reporting component further comprises result data tables.

17. The system of claim 16, wherein said result data tables comprise a benchmark summary table, an travel carrier summary table, a benchmark table and a solutions table.

18. The system of claim 14, further comprising a data quality engine configured to facilitate ensuring quality and integrity of said travel contract data and said client travel data.

* * * * *